E. R. SNYDER.

SHINGLE.

APPLICATION FILED MAR. 13, 1922.

Reissued May 9, 1922. 15,352.

INVENTOR

Edward R. Snyder

BY

Chas. W. Mortimer

ATTORNEY

UNITED STATES PATENT OFFICE.

EDWARD R. SNYDER, OF EAST ORANGE, NEW JERSEY, ASSIGNOR TO THE BARRETT COMPANY, A CORPORATION OF NEW JERSEY.

SHINGLE.

15,352. Specification of Reissued Letters Patent. Reissued May 9, 1922.

Original No. 1,365,800, dated January 18, 1921, Serial No. 244,209, filed July 10, 1918. Application for reissue filed March 13, 1922. Serial No. 543,509.

*To all whom it may concern:*

Be it known that I, EDWARD R. SNYDER, a citizen of the United States, residing at East Orange, in the county of Essex and State of New Jersey, have invented certain new and useful Improvements in Shingles, of which the following is a specification.

This invention relates to an improvement in roofing materials and is directed more especially to the class of roofings which are formed from a felt base that has been saturated with a waterproofing material and coated with a wear-resisting coating material.

An objection to roofings of this class has been that they give to the roof to which they are applied an appearance of cheapness on account of their sameness and uniformity. Different expedients have been adopted in the attempt to make such roofs simulate the appearance of wood shingle or tile roofs, such as variegated colors of the wear-resisting materials, depressions to give shadow effects, and notches to relieve the monotony.

By this present invention a shingle of excellent wearing qualities is obtained which may be applied to a roof to give the desired appearance of a roof having a uniform color or a roof having different colors alternating or distributed so as to present a pleasing appearance.

In practicing this invention an ordinary saturated felt base shingle is coated with a suitable coating such as asphalt, a layer of wear-resisting material such as crushed stone of one color is applied to one side for about one-half of the length of the shingle, and a layer of wear-resisting material of a different color or quality is applied to the opposite side of the shingle throughout substantially the same extent as the first layer, thus obtaining a shingle which is thicker at one end than at the other, having portions of different colors which may be exposed to the weather.

The invention will be more clearly understood from the accompanying drawings in which—

Figure 1:
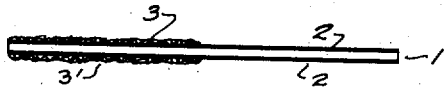
Fig. 1 represents a side view of a shingle covered on both sides with plastic material and having layers of wear-resisting material applied to a portion of the same.

On the drawings, reference character 1 designates a base of saturated felt to which coatings 2 of plastic material are applied. The felt base may be made and saturated by any of the usual methods of manufacture now commonly in use, using as the saturant tar, flux oil, or any other suitable saturant. The coatings of plastic material 2 may be pitch, asphalt or any other suitable coating material known to those skilled in the art, and it may be applied in any of the well known ways.

Figure 2:
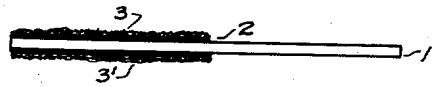
Fig. 2 is a view similar to Fig. 1, with the plastic material extending only as far as the wear-resisting material.
Figure 3:
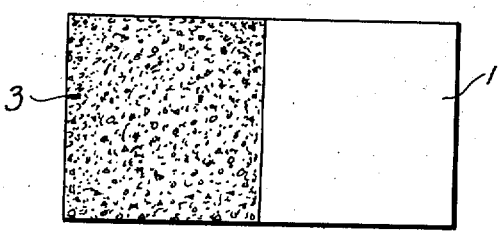
Fig. 3 is a plan view of the shingle.

Instead of the coating being applied to the entire surface of both sides of the shingle, it may be applied to both sides of only a portion of the shingle as indicated in Fig. 2. To the coating material are applied layers 3 and 3′ of pebbles, or crushed stone, or crushed slate, or other wear-resisting material, care being taken that the material applied to one side shall be of one color and that applied to the other side of a different color or quality. Any of the old and well known methods of applying the layers of crushed stone, etc., may be employed. The layers should be applied to substantially half of the surface of the shingle on both sides, and the portions covered on the two sides should be substantially co-extensive.

Figure 4:
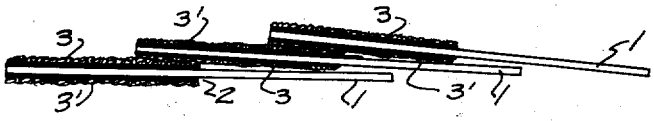
Fig. 4 is a view indicating the relation of several shingles to each other when applied to a roof.

Fig. 4 indicates how the shingles may be applied in successive courses with the coating 3 of one color exposed in one course and the coating 3′ of another color exposed in the next course and so on, alternating over the entire roof. It will be obvious that the shingles may be laid with all of the exposed surfaces of the same color, or may be laid with the colors alternating in the same course, or any other arrangement of the relations of the colors may be adopted within the discretion of the user.

It will thus be obvious that with this invention it is possible to obtain a variety of effects simply by a choice of the way in which the shingles are turned as they are laid, even though each shingle is like the others. This obviates the necessity for the purchaser to procure a supply of two or more different sorts of shingles in order to procure a variegated color scheme for his roof.

It will also be seen that the thickness of the felt base 1 together with two layers 2 of plastic material and the two layers 3 and 3′ of wear-resisting material will produce a shingle of considerable thickness at one end, thus relieving the "flat" appearance when applied to a roof or the side of a wall. The shingles will be laid with the wear-resisting portions slightly overlapping, thus leaving only the colored portions exposed.

It is preferable to use materials which differ naturally in color, such, for example, as slate and limestone, as the wear-resisting materials for the two respective sides of the shingles, although materials which have been artificially colored may be used with satisfactory results provided they retain their colors permanently.

While this invention has been described as applied to a single shingle, it is to be understood that it may be also applied with certain advantages to strips of roofing material which are slotted on one edge for some distance to resemble a series of shingles. The expression "shingle" as used in the claims is intended to include a strip of roofing material, which may consist of one shingle or a number of shingles integrally connected to each other.

I claim:—

1. A shingle of the class described having one end only covered on one side with a wear-resisting material, and covered on the other side of the same end with a different sort of wear-resisting material.

2. A shingle of the class described having substantially half of one side covered with a wear-resisting material and having the corresponding portion of the other side covered with a different sort of wear-resisting material.

3. A shingle of the class described having one end free from wear-resisting material and the two sides of the other end covered with wear-resisting material of different colors.

4. A shingle of the class described, the thickness of one end of which is determined by the thickness of the saturated felt base used in its manufacture, the thickness of the other end being determined by the thickness of the felt base, two layers of plastic coating material and two layers of wear-resisting material, said layers of wear-resisting materials being disposed on opposite sides of the felt base.

5. A shingle of the class described, one end of which comprises a felt base, the other end of which comprises a felt base, a layer of plastic material on each side of the felt base, and layers of wear-resisting material of different colors applied to the plastic layers.

6. A shingle of the class described, having both sides of one end covered with layers of wear-resisting material, said covered end being appreciably thicker than the other end.

7. A shingle of the class described, having the two respective sides of one end covered with layers of wear-resisting material of different colors, said covered end being appreciably thicker than the other end.

8. A shingle of the class described, having one end covered on one side with a wear-resisting material of one color and covered on the other side of the same end with wear-resisting material of a different color, said covered end being appreciably thicker than the other end.

9. A shingle of the class described, having substantially half of one side covered with wear-resisting material of one color and having the corresponding portion of the other side covered with wear-resisting material of a different color.

10. A shingle of the class described, having one end covered on one side with a wear-resisting material, and covered on a portion of the other side with a different sort of wear-resisting material.

11. A shingle of the class described, having one end covered on one side with a mineral wear-resisting material, and covered on the other side of the same end with a wear-resisting material of a different color, said covered end being appreciably thicker than the other end.

12. A shingle of the class described, substantially thicker at one end than at the other and having a wear-resisting surface of granules of one color on one side of said thicker end and granules of another color on the other side of said end.

13. A shingle of the class described, substantially thicker at one end than at the other and having a wear-resisting surface of slate or stone granules of one color on one side of said thicker end and slate or stone granules of another color on the other side of said end.

14. A prepared roofing mineral surfaced shingle, of which the end to be exposed to the weather is substantially thicker than the other end, the said thicker end having granules of slate or the like of one color on one side and granules of a different color on the other side.

15. A prepared roofing mineral surfaced shingle, of which the end to be exposed to the weather is substantially thicker than the other end, the said thicker end having granules of mineral matter on both sides of said end.

In testimony whereof I affix my signature.

EDWARD R. SNYDER.